United States Patent [19]
Jones et al.

[11] Patent Number: 5,529,155
[45] Date of Patent: Jun. 25, 1996

[54] SUSPENSION STRUT AND SEAL ARRANGEMENT

[75] Inventors: Nicholas Jones, La Morlaye, France; Erwin Jentsch, Riedstadt, Germany

[73] Assignees: ACG France, Gennevilliers, France; ACG Deutschland GmbH, Russelsheim, Germany

[21] Appl. No.: 389,697

[22] Filed: Feb. 14, 1995

[30] Foreign Application Priority Data

Mar. 7, 1994 [GB] United Kingdom ............... 9404343

[51] Int. Cl.⁶ ............................................. F16F 9/43
[52] U.S. Cl. ..................... 188/322.21; 188/322.17; 267/64.28; 277/9.5; 141/349; 141/67; 141/386
[58] Field of Search ............... 188/322.21, 322.17, 188/315; 267/64.28; 141/1, 4, 349, 348, 67, 383, 386; 277/9, 9.5, 11, 152

[56] References Cited

U.S. PATENT DOCUMENTS

| 4,483,377 | 11/1984 | Cubalchini | 188/322.21 X |
| 5,269,537 | 12/1993 | Kiesel | 277/164 |

FOREIGN PATENT DOCUMENTS

| 0024849 | 2/1986 | Japan | 188/322.17 |
| 0155378 | 7/1987 | Japan | 277/152 |
| 1421008 | 1/1976 | United Kingdom. | |
| 1472903 | 5/1977 | United Kingdom. | |
| 2099956 | 12/1982 | United Kingdom. | |
| WO80/01307 | 6/1980 | WIPO. | |

*Primary Examiner*—Robert J. Oberleitner
*Assistant Examiner*—Peter M. Poon
*Attorney, Agent, or Firm*—Jeffrey A. Sedlar

[57] ABSTRACT

A suspension strut comprising a tube which is closed at one end and which defines a fluid chamber; a piston rod extending through the other end of the tube; and a seal providing a substantially fluid tight seal at the other end of tube between the tube and the piston rod, the seal comprising an annular main body, an outer annular lip integral with the main body and normally sealingly engaging the piston rod, an inner annular lip integral with the main body and normally sealingly engaging the piston rod, a channel portion between the outer and inner lips and open to the piston rod, and an arm portion integrally associated with the outer lip, the arm portion being engageable to pivot at least a portion of the outer lip out of engagement with the piston rod. Allows easier gas charging of the suspension strut.

7 Claims, 3 Drawing Sheets

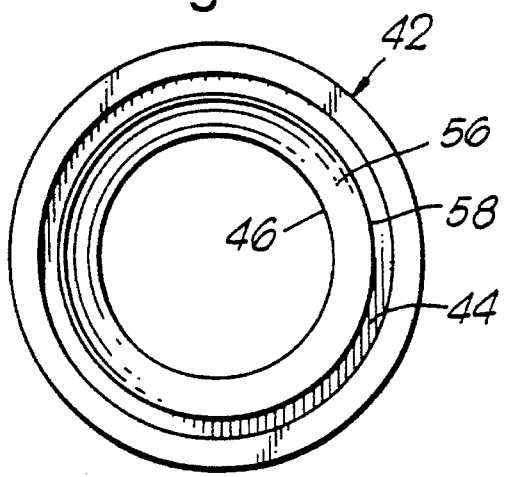
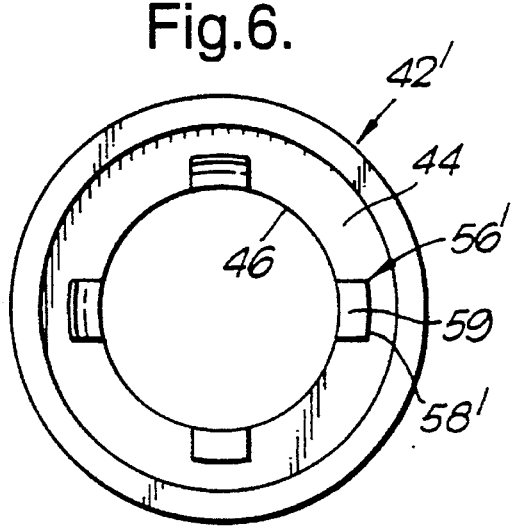
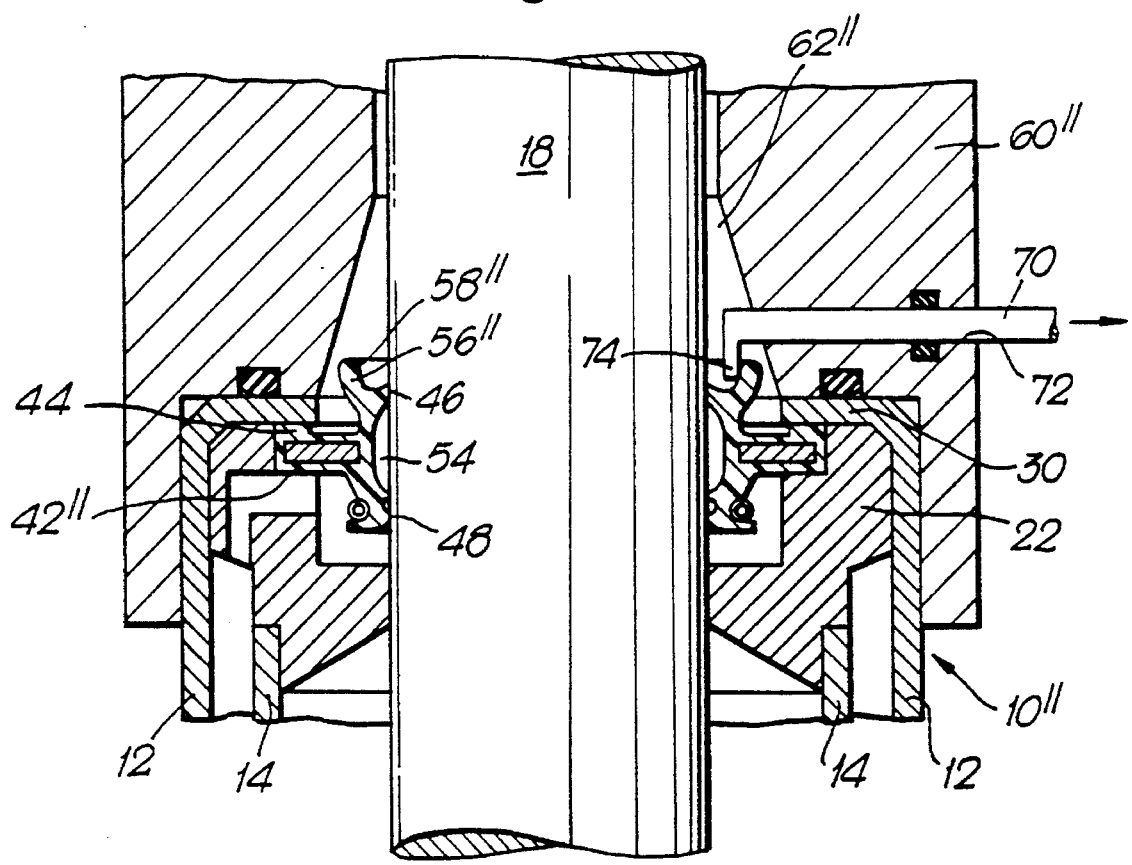

SUSPENSION STRUT AND SEAL ARRANGEMENT

BACKGROUND OF THE INVENTION

The present invention relates to a suspension strut or damper for a motor vehicle in which the suspension strut can be gas charged. The present invention also provides a method of gas charging such a suspension strut, and a seal for such a suspension strut. Gas charged suspension struts can provide improved ride quality for the motor vehicle.

Known arrangements of suspension strut comprise a tube which is closed at one end and which defines a fluid chamber, a piston rod extending through the other end of the tube, and a seal providing a substantially fluid tight seal at the other end of tube between the tube and the piston rod. For gas chargeable suspension struts, the seal typically comprises an outer lip which engages the piston rod, an inner lip which engages the piston rod, and a channel portion between the inner and outer lips. The outer lip acts as to substantially prevent dirt and other contaminants reaching the fluid chamber. The inner lip acts to substantially prevent fluid and/or gas leaving the fluid chamber. In order to gas charge the suspension strut, pressurised gas is introduced directly into the channel portion as the outer lip prevents gas entering the fluid chamber. The pressurised gas in the channel portion forces the inner lip away from the piston rod to allow gas to enter the fluid chamber. The inner lip effectively acts as a one-way valve. Several methods for gas charging are known, most of which include the steps of moving the piston rod relative to the tube until a shoulder, groove, or channel in the piston rod aligns with the channel portion in the seal to provide a passage between the channel portion and a position outside the tube, introducing pressurised gas to the passage and hence into the fluid chamber, and then moving the piston rod to close the passage. All of these arrangements, most of which are disclosed in GB Patent Application No. 2,099,956A, require accurate machining of the piston rod to provide the shoulder, groove, or channel. Other arrangements include using a special tool which engages and moves the outer lip. These arrangements can damage the outer lip and ruin its sealing operation.

SUMMARY OF THE INVENTION

It is an object of the present invention to provide an improved arrangement for gas chargeable suspension struts.

A suspension strut in accordance with the present invention comprises a tube which is closed at one end and which defines a fluid chamber; a piston rod extending through the other end of the tube; and a seal providing a substantially fluid tight seal at the other end of tube between the tube and the piston rod, the seal comprising an annular main body, an outer annular lip integral with the main body and normally sealingly engaging the piston rod, an inner annular lip integral with the main body and normally sealingly engaging the piston rod, a channel portion between the outer and inner lips and open to the piston rod, and an arm portion integrally associated with the outer lip, the arm portion being engageable to pivot at least a portion of the outer lip out of engagement with the piston rod.

The present invention also includes a method of gas charging a suspension strut as specified above, comprising engaging the arm portion to move the arm portion in a direction away from the piston rod to cause the portion of the outer lip to pivot away from and disengage the piston rod; introducing gas under pressure into the channel portion to move at least a portion of the inner lip out of engagement with the piston rod to introduce pressurised gas into the fluid chamber; ceasing the introduction of pressurised gas to allow the whole of the inner lip to re-engage the piston rod; and disengaging the arm portion to allow the whole of the outer lip to re-engage the piston rod.

The present invention further includes a seal for a suspension strut comprising a main body which is substantially annular about an axis; an outer lip integral with the main body, which is annular, and which is directed towards the axis; an inner lip integral with the main body, which is annular and which is directed towards the axis, the outer and inner annular lips defining a channel portion therebetween; and an arm portion integrally associated with the outer lip, the arm portion being engageable to pivot at least a portion of the outer lip away from the axis.

With the present invention, the need for accurate machining operations on the piston rod is no longer required, and the risk of damaging the outer lip is removed.

The present invention has particular application in suspension struts having a coaxial inner and outer tubes, such suspension struts being commonly referred to as twin tube dampers.

BRIEF DESCRIPTION OF THE DRAWINGS

The present invention will now be described, by way of example, with reference to the accompanying drawings, in which:

FIG. 5 is an end view of one end of the seal of the suspension strut of FIG. 1;

FIG. 6 is an end view of one end of an alternative seal for use with a suspension strut in accordance with the present invention; and FIG. 7 is a cross-sectional view of an alternative apparatus for carrying out a method in accordance with the present invention.

DETAILED DESCRIPTION OF THE PRESENTLY PREFERRED EMBODIMENT

Figure 1:
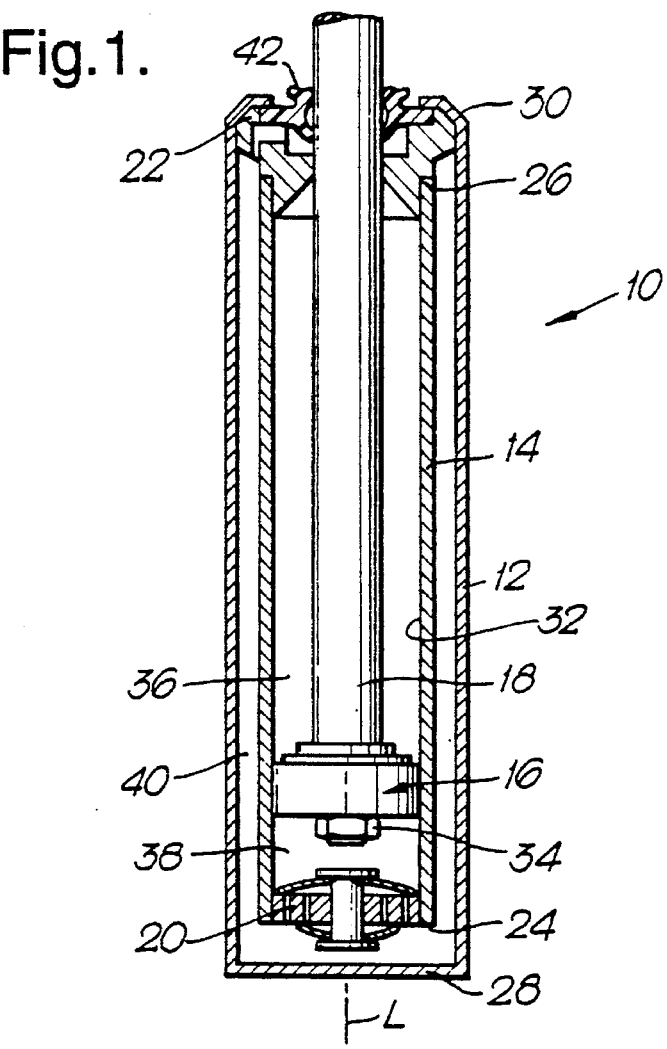
FIG. 1 is a cross-sectional view of a suspension strut in accordance with the present invention.

Referring to the FIG. 1 of the drawings, the suspension strut 10 shown in FIG. 1 is of the twin tube damper type, and comprises an outer tube 12, an inner tube 14 substantially coaxial with the outer tube on an axis L, a piston assembly 16, a piston rod 18 having a longitudinal axis on axis L, a compensation valve 20, and a rod guide 22. The piston assembly 16, the compensation valve 20 and the rod guide 22 may be any suitable conventional design well known to those skilled in the art, and will not be described in detail. The inner tube 14 is substantially closed at one end 24 by the compensation valve 20, and is substantially closed at the other end 26 by the rod guide 22. The outer tube 12 is closed at one end 28 by an integral formation of the outer tube wall, and is substantially closed at the other end 20 by the rod guide 22 and a bent-over portion of the outer tube wall. The piston rod 18 extends through, and makes a sealing sliding fit with the rod guide 22 by way of a seal 42 which is described below in more detail. The piston assembly 16 makes a sealing sliding fit with the inner surface 32 of the inner tube 14. The piston rod 16 is secured to the piston assembly 16 by a nut 34 or any other suitable arrangement. The piston 16 divides the inner area of the inner tube 14 into a rebound chamber 36 and a compression chamber 38. The area between the inner tube 14 and the outer tube 12 defines a compensation chamber 40. The rebound and compression chambers 36 and 38 are substantially filled with fluid to damp reciprocating movement of the piston assembly 16 and piston rod 18 along axis L relative to the outer and inner tubes 12 and 14. The compensating chamber 40 is partly filled with fluid and acts as a reservoir for the fluid in the rebound and compression chambers 36 and 38. Pressurised gas is also present in the compensation chamber 40. The suspension strut 10 is mounted in a motor vehicle (not shown) in the standard manner.

Figure 2:
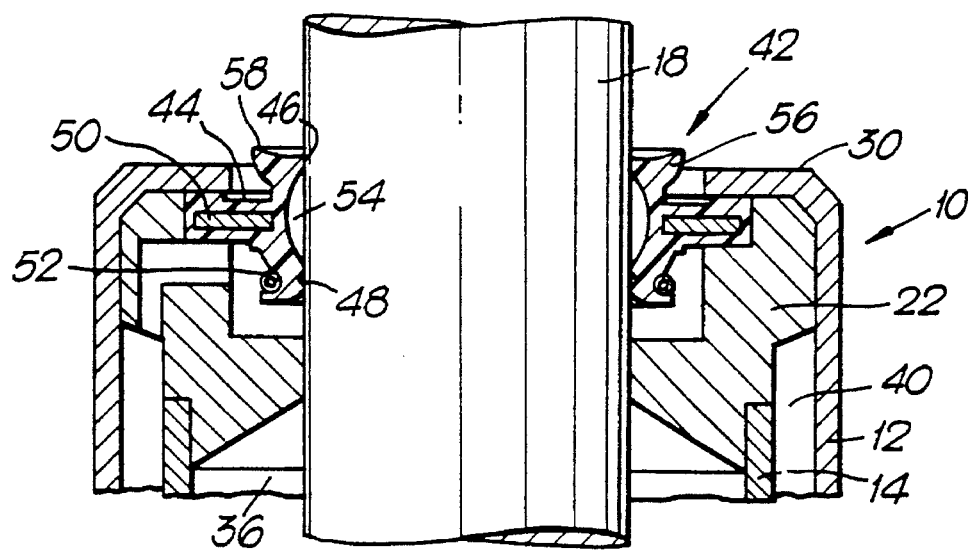
FIG. 2 is an enlarged cross-sectional view of one end of the suspension strut of FIG. 1.

Referring to FIG. 2, the seal 42 comprises an annular main body 44, an outer annular lip 46 which is integral with the main body, and an inner annular lip which is integral with the main body. The main body 44 and the outer and inner lips 46,48 are preferably made of elastomeric material. A substantially rigid annular insert 50 in the main body 44 provides a strengthening member for the seal 42. The outer lip 46 of the seal 42 is directed outwardly away from the rod guide 22 and engages the piston rod 18 to substantially prevent dirt and other contaminants entering the chambers 36,38,40 of the suspension strut 10. The inner lip 48 of the seal 42 is directed inwardly towards the rebound chamber 36 and engages the piston rod 18 to substantially prevent egress of fluid and gas from the chambers 36,38,40 of the suspension strut 10. An annular spring 52 or other resilient means acts on the inner lip 48 to retain the inner lip in contact with the piston rod 18. The main body 44 of the seal is trapped between the other end 30 of the outer tube 12 and the rod guide 22 to substantially prevent egress of fluid and gas from the chambers 36,38,40 of the suspension strut 10. The arrangement of the outer and inner lips 46,48 is such that an annular channel 54 is formed in the seal 42 between the outer and inner lips which is open to the piston rod 18. The elements of the seal 42 so far described are known. The seal 42 further comprises an arm portion 56 which is preferably substantially annular (as shown in FIG. 5) and which is integrally associated with the outer lip 46. The arm portion 56 extends in a direction substantially away from the outer lip 46, and has a free edge 58. The presence of the arm portion 56 allows easier introduction of pressurised gas into the suspension strut 10 (as described below) than previously known arrangements.

Figure 3:
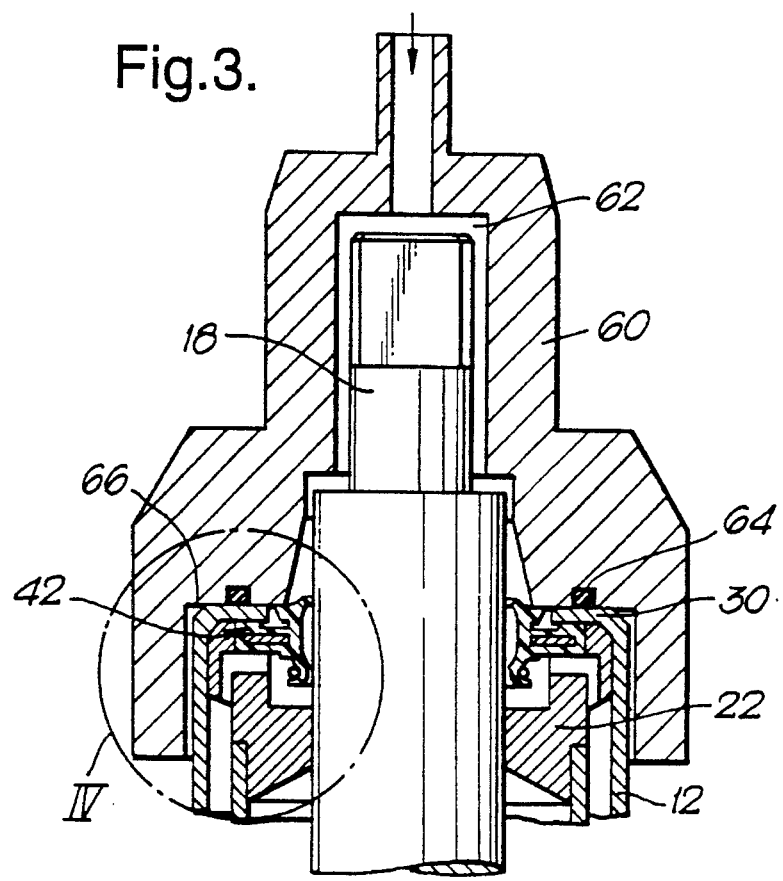
FIG. 3 is a cross-sectional view of apparatus for carrying out a method in accordance with the present invention.
Figure 4:
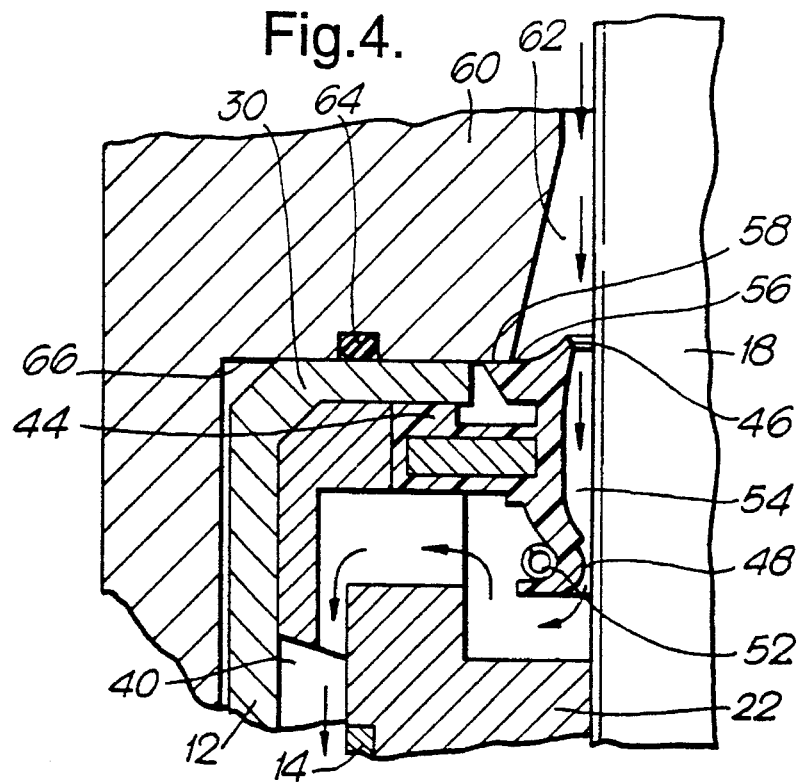
FIG. 4 is an enlarged view of the area marked IV in FIG. 3.

The suspension strut 10 can be charged with pressurised gas using a gas insertion head 60 as shown in FIGS. 3 and 4. The gas insertion head 60 has a through bore 62 which is shaped and sized to fit over the other end 30 of the outer tube 12. An O-ring seal 64 in a shoulder 66 in the through bore 62 engages the other end 30. As the gas insertion head 60 is brought into engagement with the other end 30, the shoulder 66 engages the free edge 58 of the arm portion 56 of the seal 42 to push the free edge towards the piston guide 22. This action causes the outer lip 46 to pivot relative to the main body 44 such that all or substantially all of the outer lip moves away from engagement with the piston rod 18. Pressurised gas is then introduced into the through bore 62 from any suitable source. The pressurised gas passes the outer lip 46, enters the channel 54 and then acts on the inner lip 48 to move at least a portion of the inner lip out of engagement with the piston rod 18 against the bias of the spring 52, as indicated by the arrows in FIGS. 3 and 4. This arrangement allows the suspension strut 10 to be charged with pressurised gas. On completion of the gas charging operation, the supply of pressurised gas is removed which allows the inner seal 48 to re-engage the piston rod 18. The gas insertion head 60 is then removed which allows the outer seal 46 to re-engage the piston rod 18.

An alternative form of the seal 42 is shown in FIG. 6. In this arrangement, the arm portion 56' comprises four equidistantly spaced tabs 59 each of which has a free edge 58'. The other features of the seal 42' are as described above, and the gas charging of the suspension strut 10 is carried out as described above. In this case, only the portions of the outer lip 46 adjacent the tabs 59 pivot away from the piston rod 18 during gas charging.

A further alternative form of seal 42" is shown in FIG. 7. In this arrangement, the arm portion 56" is substantially annular as in the seal shown in FIGS. 1 to 5, but extends is a direction which is substantially parallel to the piston rod 18. Other features of the seal 42" are substantially the same as the seal 42 shown in FIGS. 1 to 5. In this alternative arrangement, the gas charging head 60" includes a tool 70 which extends through a bore 72 which opens into the through bore 62" and has a hooked end 74 positioned in the through bore. The tool 70 sealingly slides in the bore 72. In order to gas charge the suspension strut 10", the hooked end 74 of the tool 70 is brought into engagement with the free edge 58" of the arm portion 56" of the seal 42", and the tool is moved in the direction of the arrow shown in FIG. 7 to pivot a portion of the outer lip 46 of the seal out of engagement with the piston rod 18. Pressurised gas is then introduced into the suspension strut 10". After gas charging, the hooked end 74 of the tool 70 is disengaged from the arm portion 56" to allow the whole of the outer lip 46" to re-engage the piston rod 18.

What is claimed is:

1. A suspension strut comprising a tube which is closed at one end and which defines a fluid chamber; a piston rod extending through the other end of the tube; and a seal providing a substantially fluid tight seal at the other end of tube between the tube and the piston rod, the seal comprising an annular main body, an outer annular lip integral with the main body and normally sealingly engaging the piston rod, an inner annular lip integral with the main body and normally sealingly engaging the piston rod, a channel portion between the outer and inner lips and open to the piston rod, and an arm portion integrally associated with the outer lip, the arm portion being engageable to pivot at least a portion of the outer lip out of engagement with the piston rod.

2. A suspension strut as claimed in claim 1, wherein the arm portion is annular, engagement thereof pivoting substantially all of the outer lip out of engagement with the piston rod.

3. A suspension strut as claimed in claim 1, wherein the arm portion comprises at least a pair of diametrically opposed tabs.

4. A method of gas charging a suspension strut having a fluid chamber, a piston rod and a seal with an arm portion and outer and inner lips engaging the piston rod, with a channel portion defined between the piston rod and the seal, comprising engaging the arm portion to move the arm portion in a direction away from the piston rod to cause the portion of the outer lip to pivot away from and disengage the piston rod; introducing gas under pressure into the channel portion to move at least a portion of the inner lip out of engagement with the piston rod to introduce pressurised gas into the fluid chamber; ceasing the introduction of pressurised gas to allow the whole of the inner lip to re-engage the piston rod; and disengaging the arm portion to allow the whole of the outer lip to re-engage the piston rod.

5. A method as claimed in claim 4, wherein the arm portion is engaged by a tool which pushes the arm portion in a direction substantially towards the fluid chamber.

6. A method as claimed in claim 4, wherein the arm portion is engaged by a tool which pulls the arm portion in a direction substantially away from the piston rod.

7. A suspension strut seal comprising a main body which is substantially annular about an axis; an outer lip integral with the main body, which is annular, and which is directed towards the axis; an inner lip integral with the main body, which is annular and which is directed towards the axis, the outer and inner annular lips defining a channel portion therebetween; and an arm portion integrally associated with the outer lip, the arm portion being engageable to pivot at least a portion of the outer lip away from the axis.

* * * * *